(12) United States Patent
Medvedev et al.

(10) Patent No.: US 11,703,846 B2
(45) Date of Patent: Jul. 18, 2023

(54) EQUIPMENT FAILURE DIAGNOSTICS USING BAYESIAN INFERENCE

(71) Applicant: Schlumberger Technology Corporation, Sugar Land, TX (US)

(72) Inventors: Oleg O. Medvedev, Missouri City, TX (US); Marcus D. Sprenkel, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 75 days.

(21) Appl. No.: 17/595,536

(22) PCT Filed: May 28, 2020

(86) PCT No.: PCT/US2020/034915
§ 371 (c)(1),
(2) Date: Nov. 18, 2021

(87) PCT Pub. No.: WO2020/243297
PCT Pub. Date: Dec. 3, 2020

(65) Prior Publication Data
US 2022/0244716 A1    Aug. 4, 2022

Related U.S. Application Data

(60) Provisional application No. 62/854,748, filed on May 30, 2019.

(51) Int. Cl.
| G05B 23/02 | (2006.01) |
| G06N 20/00 | (2019.01) |
| G06F 18/2415 | (2023.01) |

(52) U.S. Cl.
CPC ....... *G05B 23/024* (2013.01); *G05B 23/0275* (2013.01); *G06F 18/24155* (2023.01); *G06N 20/00* (2019.01)

(58) Field of Classification Search
CPC .............. G05B 23/024; G05B 23/0275; G06F 18/24155; G06N 7/01
See application file for complete search history.

(56) References Cited

U.S. PATENT DOCUMENTS

| 6,415,276 B1 | 7/2002 | Heger et al. |
| 7,536,372 B2 | 5/2009 | Cox et al. |

(Continued)

FOREIGN PATENT DOCUMENTS

| CN | 110826237 A | 2/2020 |
| KR | 1020110057539 A | 6/2011 |
| KR | 101086027 B1 | 11/2011 |

OTHER PUBLICATIONS

International Search Report and Written Opinion issued in PCT application PCT/US2020/034915, dated Sep. 11, 2020 (11 pages).

(Continued)

*Primary Examiner* — Mischita L Henson
(74) *Attorney, Agent, or Firm* — Jeffrey D. Frantz

(57) ABSTRACT

A method is described herein, comprising registering an event at a first processing unit of a processing facility comprising a plurality of processing units, using a coincidence probability array and an event probability to identify a second processing unit of the plurality of processing units based on the event, determining whether the second processing unit experienced a coincident event, if the second processing unit experienced a coincident event, remediating a condition of the second processing unit that caused the coincident event, and updating the coincidence probability array based on the event.

20 Claims, 3 Drawing Sheets

(56) References Cited

U.S. PATENT DOCUMENTS

| | | | |
|---|---|---|---|
| 8,140,454 B2* | 3/2012 | Bullen | G06Q 10/06 |
| | | | 706/14 |
| 8,744,985 B2* | 6/2014 | Singliar | G06N 7/01 |
| | | | 706/12 |
| 8,849,729 B2 | 9/2014 | Cox et al. | |
| 9,645,575 B2 | 5/2017 | Watson | |
| 9,753,455 B2 | 9/2017 | Drees | |
| 2005/0060323 A1* | 3/2005 | Leung | G05B 23/0275 |
| 2011/0185234 A1* | 7/2011 | Cohen | G06F 11/3476 |
| | | | 714/E11.029 |
| 2011/0220410 A1* | 9/2011 | Aldred | G05B 13/04 |
| | | | 175/26 |
| 2015/0309855 A1 | 10/2015 | Agnihotram et al. | |
| 2016/0092808 A1 | 3/2016 | Cheng et al. | |
| 2016/0239755 A1 | 8/2016 | Aggour et al. | |
| 2017/0249554 A1 | 8/2017 | Zirnstein et al. | |

OTHER PUBLICATIONS

Sammouri, W. et al., "Temporal association rule mining for the preventive diagnosis of onboard subsystems within floating train data framework", presented at the 2012 15th International IEEE Conference on Intelligent Transporation Systems, Anchorage, Alaska, U.S.A., pp. 1351-1356.

Salfner, F. et al., "A Survey of Online Failure Prediction Methods", ACM Computing Surveys, 2010 68(3), 68 pages.

* cited by examiner

EQUIPMENT FAILURE DIAGNOSTICS USING BAYESIAN INFERENCE

CROSS-REFERENCE TO RELATED APPLICATION

The present document is based on and claims priority to U.S. Provisional Application Ser. No.: 62/854,748, filed May 30, 2019, which is incorporated herein by reference in its entirety.

FIELD

Embodiments herein generally relate to maintenance of processing facilities. Specifically, methods and apparatus for diagnosing failures and other events in complex processing systems are described.

BACKGROUND

Complex processing systems commonly employ numerous processing units interconnected in various ways to make highly technical products or upgrade materials. From oil refineries and wellhead processing facilities to automobile assembly plants to semiconductor fabrication plants, these complex processing systems depend on reliable functioning of the various processing units to maintain high quality operations. A failure of a critical processing unit can bring down a billion-dollar processing facility causing losses in the millions of dollars per day of downtime. For this reason, many manufacturers invest in redundant critical processing units to prevent the entire facility going off-line when one critical processing unit experiences a failure.

Downtime is often extended during such failures by the need to identify the cause of the failure. In some cases, a failure in one unit, resulting in a highly visible production outage, might be cause by a less visible failure in another unit. Identifying and correcting root causes can extend downtimes and the resulting losses. There is a need for improved methods of identifying root causes of equipment failures in complex processing systems.

SUMMARY

Embodiments described herein provide a method, comprising registering a first failure at a first processing unit of a processing facility comprising a plurality of processing units; using a Bayesian inference engine to determine a probability that a second processing unit of the processing facility experienced a second failure based on occurrence of the first failure; in the event that the probability is above a predetermined threshold, determining whether the second processing unit experienced the second failure; in the event that it is determined that the second processing unit experienced the second failure, remediating a condition of the second processing unit that caused the second failure; and updating the Bayesian inference engine with occurrence or non-occurrence of the first and second failures.

Other embodiments described herein provide a method, comprising registering a first event at a first processing unit of a first processing facility comprising a first plurality of processing units; using a Bayesian inference engine to determine a probability that a second processing unit of the first processing facility experienced a second event based on occurrence of the first event and based on historical occurrences of the first and second events in a plurality of processing facilities; in the event that the probability is above a predetermined threshold, determining whether the second processing unit experienced the second event; in the event it is determined that the second processing unit experienced the second event, remediating a condition of the second processing unit that caused the second event; and updating the Bayesian inference engine with occurrence or non-occurrence of the first and second events at the first processing facility.

Other embodiments provide a method, comprising registering a first event at a first processing unit of a processing facility comprising a first plurality of processing units; using a Bayesian inference engine to determine a probability that a second processing unit of the first processing facility experienced a second event based on occurrence of the first event and based on historical occurrences of the first and second events in a plurality of processing facilities; in the event that the probability is above a predetermined first threshold, determining whether the second processing unit experienced the second event; in the event it is determined that the second processing unit experienced the second event, remediating a condition of the second processing unit that caused the second event; updating the Bayesian inference engine with occurrence or non-occurrence of the first and second events at the processing facility; in the event that the probability is above a predetermined second threshold, initiating a preventive action with respect to the second event in every processing facility of the plurality of processing facilities.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

To improve identification of coincident equipment failures in complex processing systems, it can be useful to determine the probability of coincidence of conditions. When a number of conditions might exist in the complex system, when a particular condition is observed in the system, it can be useful to identify the probability that other conditions also exist. In a processing setting, for example, a processing facility might consist of many interconnected and/or interoperating processing units that together achieve a certain result, like a finished product or slate of products, or an upgraded or purified material. When a failure is observed in the processing facility, it can be useful to identify the likeliest causes of the failure or other coincident failures.

Bayesian methods can be used to help identify the most likely coincident failures when an equipment failure incident is observed. If we know that B has happened, the probability that A has also happened is the prior probability that, when A happened in the past, B also happened times the overall likelihood of B happening, divided by the overall likelihood of A happening. In an equipment failure scenario, suppose there are two machines A and B. If B has failed, the likelihood that A has also failed is the prior probability that, when A failed in the past, B also failed (number of instances when A and B both failed), times the overall downtime of machine B (percent downtime) divided by the overall downtime of machine A (percent downtime). If there are three machines, A, B, and C, if C has failed, the probability that A has also failed is the probability that, when A failed in the past, C also failed times the percent downtime of C divided by percent downtime of A. A similar probability applies to B. Using such methods, coincident failures can be predicted based on a failure observed in a unit of a processing facility.

Commercially available Bayesian inference engines can be used to maintain statistics on historical events. Such engines provide the capability to compute, using Bayesian methods, the likelihood that A has happened when B is observed. The use of such engines to improve diagnosis of events in processing facilities is described herein.

Figure 1:
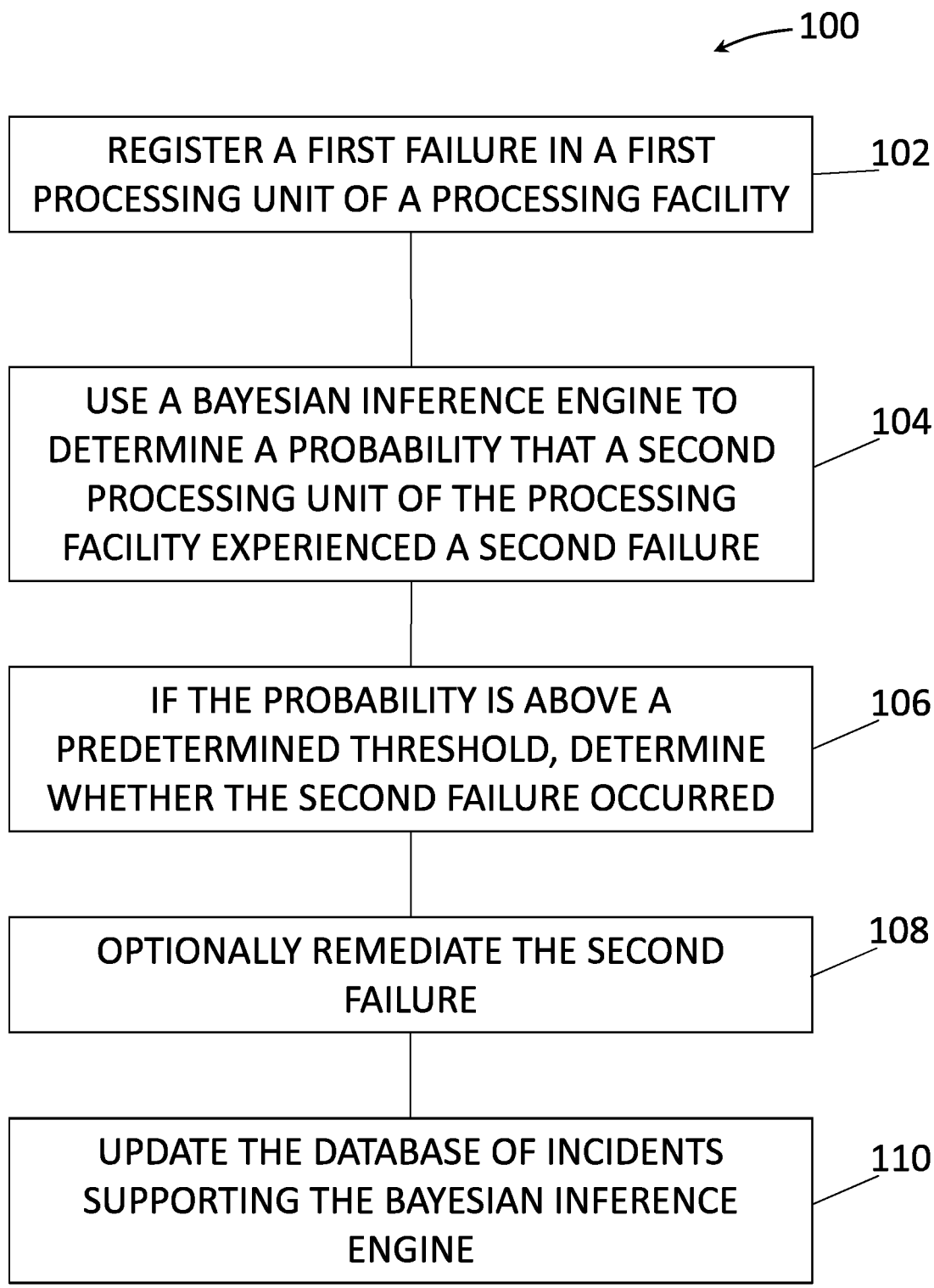
FIG. 1 is a flow diagram summarizing a method according to one embodiment.

FIG. 1 is a flow diagram summarizing a method 100 according to one embodiment. The method 100 is useful in instances where equipment failure has occurred in a complex system. The method 100 identifies the probability that, if one piece of equipment failed, other pieces of equipment also failed. When such failures are observed, the probabilities provided by using the method 100 can be used to prioritize investigation and remediation of causes in the complex system to remediate the overall failure in the least amount of time.

At 102, a failure is registered in a processing facility. The processing facility comprises a plurality of processing units that operate together to achieve a certain result, such as a manufactured product or upgraded or purified material. Examples include petrochemical plants, semiconductor and display fabrication facilities, and automotive assembly plants. The processing facility may be a manufacturing facility that makes finished or intermediate products, or an upgrading or purification facility that improves the state of a material. The failure may be an event that interrupts operation of the processing unit or another event that changes a capability of the processing unit in an unfavorable way, like a product excursion, production loss, or processing unit recycle condition. In general, the failure is typically an event for which root cause identification and remediation is needed.

At 104, a Bayesian inference engine is used to determine a probability that a second processing unit of the processing facility experienced a second failure based on occurrence of the first failure. The typical Bayesian inference engine includes records of past events and coincident events, and accepts as input the occurrence of one of the events in the database record. The typical Bayesian inference engine is then capable of returning a probability that one or more other events also happened. In this case, the observed failure is provided to the engine as input, and the engine returns probabilities of one or more other events that might have happened coincidentally with the observed event.

At 106, in the event that the probability is above a predetermined threshold, an investigation can be undertaken to determine whether the second failure actually happened. For example, if the probability is so slight, for example 1%, that the second failure occurred, the operator of the processing facility may judge that resources do not need to be expended to investigate the potential second failure, since the probability is remote. On the other hand, if the probability is moderate to high, for example 50%, the operator may judge the resources well-spent to investigate the potential second failure. The use of the Bayesian inference engine to determine the probability of the second failure thus allows optimum use of resources in a processing setting.

The predetermined threshold probability for deploying resources to investigate the potential second failure may be determined according to the severity of the first failure or the second failure. If either the first failure or the second failure has a large impact on operation of the facility, the threshold probability can be set relatively low to deploy resources more frequently when the first failure is observed, and vice versa.

At 108, in the event that the investigation determines that the second failure happened at the second processing unit, a remedial action can be taken to remove the condition of the second processing unit causing the second failure. Remedial action can also be postponed or omitted entirely. At 110, the database used by the Bayesian inference engine is updated to include record of occurrence of the first failure along with occurrence or non-occurrence of the second failure. This update may be a function integral to the Bayesian inference engine itself, or may be performed in a database accessible to the Bayesian inference engine.

It should be noted that the database for the Bayesian inference engine may be predicated on any operative relationship between events. The database may reflect mere coincidence of failures where causation may or may not have been established, or if causation is determined in each case, the database may reflect instances where it was determined that one failure caused another failure. Probabilities returned by the engine are understood to represent the same operative relationship on which the database is predicated.

The method 100 can be extended to more than two failure events. For example, the events database may reflect a plurality of failure events that happen in some coincidence with the first failure. In such cases, the Bayesian inference engine can return a plurality of probabilities representing the probability that each respective event of the plurality of events happened based on occurrence of the first failure. In such cases, each event of the plurality of events with a probability exceeding a predetermined threshold can be investigated, in order from highest probability to lowest probability, to determine whether the event happened. In such cases, the database supporting the Bayesian inference engine is updated with the occurrence or non-occurrence of each event in the plurality of events.

The method 100 can also be extended to analyze a potential chain of coincident failures that may have led to the first failure event. For example, if a second failure event has a finite probability given observance of the first failure event, a hypothetical can be posed in which the second failure event has occurred, and a probability that a third failure event has also occurred, based on hypothetical occurrence of the second failure event, can be determined. The Bayesian inference engine can compute a hypothetical chain of probabilities upon observance of the first failure event, as an indication that the third failure event may need to be investigated. When the occurrence or non-occurrence of the second failure event is recorded in the database supporting the inference engine, the probability that the third failure event has occurred can be recalculated, and a decision can then be made about deploying resources to investigate the potential third failure event.

Figure 2:
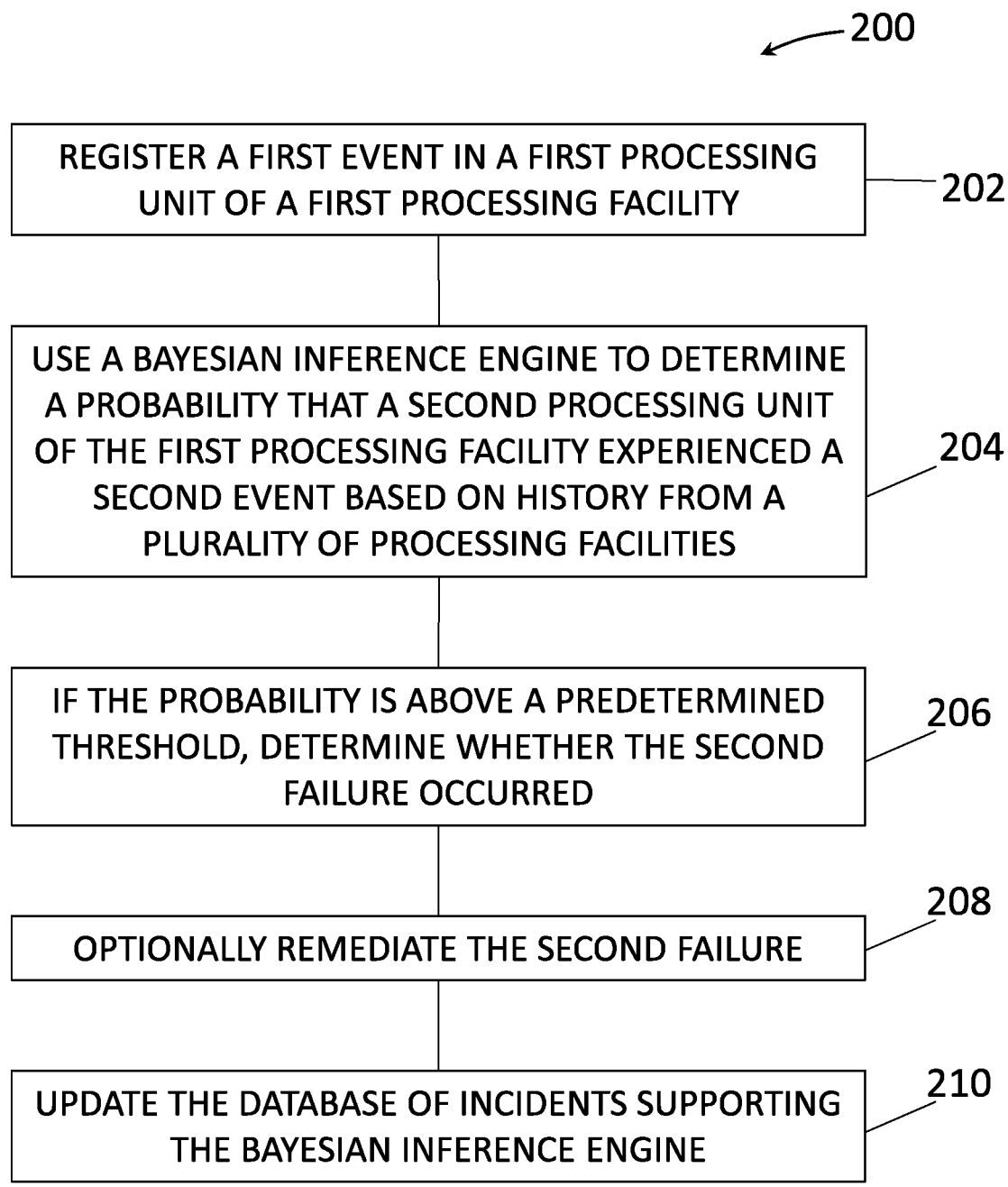
FIG. 2 is a flow diagram summarizing a method according to another embodiment.

FIG. 2 is a flow diagram summarizing a method 200 according to another embodiment. The method 200 extends use of the method 100 to instances where multiple processing facilities have the same equipment in the same general configuration such that the same events may reasonably be thought to occur in the same operative relationships. At 202, a first event is registered at a first processing unit of a first processing facility. The first processing facility, in this case, is part of a conglomerate that includes a number of processing facilities with similar equipment.

At 204, Bayesian inference engine is used to determine a probability that a second processing unit of the first processing facility experienced a second event based on occurrence of the first event and based on historical occurrences of the first and second events in a plurality of processing facilities. Here, the inference engine is supported by a database including a historical record of events from a plurality of processing facilities that either have the first and second processing units in the same or similar operating relationship. The database includes records relating events pertaining to the first and second processing units in all the facilities. The inference engine computes a probability that the second processing unit of the first processing facility experienced a second event based on the occurrence of the first event by computing the conditional probability from all facilities having the first and second processing units. In this way, a larger population can be sampled for higher statistical confidence in the result.

At 206, the second event is investigated if the probability is above a predetermined threshold, as in the method 100. In this case, the threshold can be determined based on severity of the events, as above, but can also be determined based on characteristics of the processing facilities. For example, if the first event happens at a first processing facility with a first characteristic value, and the first event happens at a second processing facility with a second characteristic value different from the first characteristic value, the probability threshold might be set at different levels if the first or second characteristic values make responding to the first event more urgent for some reason. For example, if the first event can be related to ambient temperature, and the first and second processing facilities are at locations with substantially different ambient temperatures, it may be prudent to be more sensitive to occurrence of the first event in one ambient based on the temperature difference. Other characteristics, such as humidity, geology or geography may also be characteristics that can affect the planned response.

At 208, the second event is optionally remediated, as above. At 210, the database supporting the Bayesian inference engine is updated with occurrence of the first event, and occurrence or non-occurrence of the second event. The database may include record of which processing facility experienced the first event.

The Bayesian inference engine, in this case, can be deployed to each processing facility that includes the processing units tracked in the database. Whenever any event occurs at any of the processing facilities, the Bayesian inference engine can compute the probability by referring to the database. The database can be located on a central server that communicates with all instances of the inference engine. Each instance of the inference engine updates the central database when an event is recorded at a processing facility. In one case, each instance of the inference engine may have access to a local copy of the database, optionally with no central copy of the database. In some cases, a blockchain process can be used to validate and update copies of the database co-located with instances of the inference engine whenever one processing facility experiences an event that requires an update to the database.

The method 200 supports computing probabilities for a plurality of potentially related events as well. As with the method 100, the Bayesian inference engine can compute the probability that a plurality of events occurred in the first processing facility, based on occurrence of the first event, and based on the historical occurrence of the first event and the plurality of events coincidentally at a plurality of processing facilities. It should be noted that the plurality of processing facilities need not be exact duplicates. For a collection of processing units, the processing units may be distributed amongst the processing facilities such that a relationship of two events may only apply to a subset of the processing facilities. Nonetheless, the method 200 can be used to aggregate the experience of the subset of processing facilities with respect to the two events to increase statistical confidence. In such cases, the Bayesian inference engine will compute the probability that a second event occurred based on the occurrence of the first event irrespective of where the pair of events occurred in the past. The database supporting the inference engine can be constructed to link individual occurrences and non-occurrences of the second event with occurrences of the first event irrespective of location.

Figure 3:
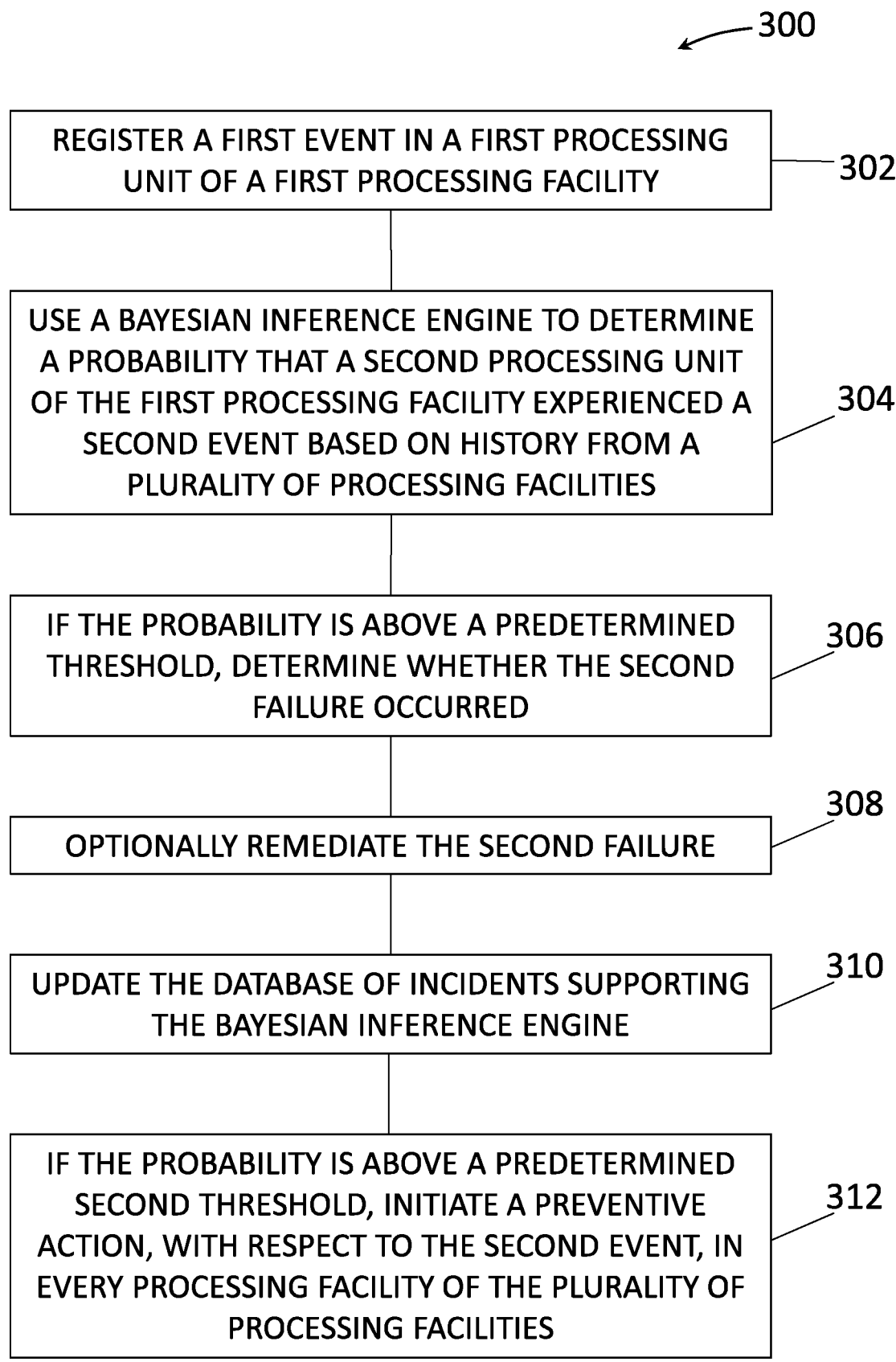
FIG. 3 is a flow diagram summarizing a method according to yet another embodiment.

FIG. 3 is a flow diagram summarizing a method 300 according to another embodiment. The method 300 is similar to the method 200, with the addition of an operation at 312 to compare the determined probability to a second predetermined threshold. If the probability is above the predetermined second threshold, a preventive action is initiated, with respect to the second event, at all processing facilities of the plurality of processing facilities where the second event could occur. This could be all processing facilities of the plurality of processing facilities that have the second processing unit, or a version thereof, where the second event was predicted for the first processing facility. Optionally, a hypothetical computation could be performed after updating the database at 310 to determine whether concident occurrence of the first and second events at the first processing facility has made the coincident occurrence of the first and second events at all relevant processing facilities probable enough to initiate the preventive action prior to any future occurrence of the first event.

The results of the probability computation can be influenced, with some Bayesian inference engines, by providing weighting factors to the events in the database based on any identified characteristics of the events. The inference engine computes probability distributions for historical coincidences of the events, and these probability distributions can be affected by weighting the events more or less based on characteristics of the events. For example, the coincidence of two events might have a more severe effect at one location than another. In such cases, the probabilities might be weighted to be higher for the location with higher severity. In this case, the computed probability is interpreted not as a probability that the coincidence occurred, but as a probability of a coincidence occurring with severity high enough to warrant a heightened response posture.

The method 300 can be extended in the manner described for the methods 200 and 100 to include computing probabilities for other related events. A plurality of probabilities can be computed for a plurality of events, based on the first event, and based on event history from a plurality of processing facilities, and the related events having probabilities above the predetermined first threshold can be investigated to see whether they occurred, in priority order from highest probability to lowest probability. The events having probabilities higher than the predetermined second threshold can also trigger preventive action at all processing facilities where the event is relevant. The method 300 can also be extended to include potential causation chains of related events. For example, upon identifying a second event with a certain probability of coincidence with the first event, a hypothetical computation can be performed assuming the second event happened, and based on the event history from the plurality of processing facilities, to determine a probability that a third event might have happened based on hypothetical occurrence of the second event. Any number of chained coincidences can be queried in this manner, and any probabilities meeting predetermined thresholds can be investigated and remedial or preventative action taken at the first processing facility and/or all processing facilities where the respective events are relevant.

The Bayesian inference engine computes probabilities of coincident events, as conditional probabilities, based on a database of past events. The database of past events, as described above, can be located on the same server as the Bayesian inference engine, or can be located on a separate database server to which the Bayesian inference engine has access. The engine server and the database server may communicate via a local network, which may be wired or wireless, or via a wide network, such as the internet. As noted above, the database is updated when events occur, and for a collection of events, each time one event occurs, the instance of other events in the collection is noted in order to record the co-occurrence, and the non-co-occurrence, of the events.

In the event a new database is to be set up to support use of a Bayesian inference engine as described herein, the new database can be initiated with hypothetical events created from engineering knowledge of the processing facility. Operational weakness evaluations are typically done in processing facilities, and the results of such evaluations can be rendered in the form of a hypothetical list of events with co-occurrences hypothecated based on engineering judgments about such co-occurrences. In the absence of such an activity, a list of events can be started prior to first use of the Bayesian inference engine, and when the database reaches a sufficient size, use of the inference engine can begin. In an existing database, if a new event is added to the database, the event can be initiated with hypothetical records, as described above, or the event can be initiated with no records, and the inference engine will return probabilities of zero until a co-occurrence of the event with another event is recorded in the database.

The Bayesian inference engine is used in the ways described herein to provide information useful to operators of a processing facility about events and failures within the processing facility that might not be otherwise apparent or visible to the operators. The information rendered by the inference engine can be used by engineers and operators to investigate and remediate potential events and failures that might impact operation of a processing facility. The probabilities rendered by the inference engine can be archived and consulted over time to detect and/or determine any additional conclusions that might be drawn. For example, trends in the probability of coincidence between two events can be examined, conclusions potentially drawn, and actions taken to improve operations based on those trends. For example, if the likelihood of coincidence of two events, as quantified by the probabilities received from the Bayesian inference engine, is increasing over time, changes may be sought, based on engineering knowledge, that might be causing an increasing co-occurrence of the two events, and those changes can be remediated if doing so would improve the operation. The relationship between two trends of probabilities can also yield information. For example, stored probabilities can be trended, and the trends compared, to determine that likelihood of co-occurrence of events A and B is increasing, but likelihood of co-occurrence of events A and C is decreasing. Engineering resources can then be shifted away from examining the interaction of events A and C and toward examining the interaction of events A and B.

Application of Bayesian inference engines to a processing environment, as described herein, can be understood as a predictive model of events. Given an event A that is observed to happen, the likelihood that event B has, or will happen, can be computed using a Bayesian inference engine with access to a database of historical events. If it is determined that event B has not happened, it may be that event B will happen in the near future, and the equipment susceptible to event B happening can be evaluated for any signs of failure. In some cases, it may be understood that event A causes event B, but it is not necessary to conclude causation in order to use the methods herein to predict coincidence. For example, if A is observed, but B is not, and it is determined that B occurred, it may be that B causes A, or that A and B have a common cause. Engineering knowledge can be applied to establish causation between events, and if such causation is established A and B can be understood as causally related.

Use of Bayesian inference can be helpful in a processing environment because not all events that need attention are necessarily directly observable by instrumentation. For example, when a level instrument fails in a vessel holding a liquid level, it may be that an upset in an upstream unit caused some circumstance that resulted in the failure of the level instrument. A Bayesian inference engine with access to a historical database of events can compute the likelihood that other events happened along with the level instrument failure, or that another event caused the level instrument failure. Application of the Bayesian inference engine can also determine the likelihood that failure of the level instrument might have caused other events in the processing facility. In this sense, use of the Bayesian inference engine can be diagnostic and/or predictive.

Most commercially available Bayesian inference engines provide the capability to render a Bayesian network of events from a historical database of events. The Bayesian network yields the probability of occurrence of every event related in any way to a given event. Such tools can be used to query the Bayesian network for patterns of related events to determine objects or events that have large impact on the processing facility through high probabilities of many events or impacts on many units. A hypothetical probability of 100% can be entered for one event of the Bayesian network, representing that the event has occurred, and the probability distribution of other events in the network can be observed using the Bayesian network and action taken, if desired, to mitigate the events.

All the methods described herein may be applied to processing environments commonly found in oil and gas production. For example, separation trains that separate gases or liquids are commonly used in oil and gas production, and many such separation trains may be operated at different locations. Each separation train can be a processing facility as described herein, and individual separation units within the separation train can be a processing unit. For example, a membrane separation train can be a processing facility to which Bayesian inference can be applied, as described herein. The membrane separation train typically comprises a plurality of membrane separation units, each of which can be a processing unit as described in the methods herein. Another example is a liquids separation train that separates, for example, oil and water. A liquid separation facility may include a plurality of electrical separators in an electrical separator train, wherein each electrical separator is a processing unit, as described herein.

While the foregoing is directed to embodiments of the subject matter of this disclosure, other and further embodiments of the present disclosure may be devised without departing from the basic scope thereof, and the scope thereof is determined by the claims that follow.

What is claimed is:

1. A method, comprising:
    registering a first failure at a first processing unit of a processing facility comprising a plurality of processing units;
    using a Bayesian inference engine to determine a probability that a second processing unit of the processing facility experienced a second failure based on occurrence of the first failure;
    in the event that the probability is above a predetermined threshold, determining whether the second processing unit experienced the second failure;
    in the event that it is determined that the second processing unit experienced the second failure, remediating a condition of the second processing unit that caused the second failure; and
    updating the Bayesian inference engine with occurrence or non-occurrence of the first and second failures.

2. The method of claim 1, wherein the threshold is determined based on a first severity of the first failure or based on a second severity of the second failure.

3. The method of claim 1, further comprising using the Bayesian inference engine to determine a probability that each of a plurality of failures occurred at any processing unit of the processing facility based on occurrence of the first failure.

4. The method of claim 3, further comprising, for each failure of the plurality of failures, if the probability that the failure occurred is above a predetermined threshold defined for each failure of the plurality of failures, determining whether the failure occurred, in order of highest probability to lowest probability.

5. The method of claim 4, wherein each threshold is determined based on a severity of each failure.

6. The method of claim 4, further comprising updating the Bayesian inference engine with records of occurrence and non-occurrence of each respective failure of the plurality of failures.

7. The method of claim 1, further comprising using the Bayesian inference engine to determine a probability that a third processing unit of the processing facility experienced a third failure based on occurrence of the second failure.

8. A method, comprising:
    registering a first event at a first processing unit of a first processing facility comprising a first plurality of processing units;
    using a Bayesian inference engine to determine a probability that a second processing unit of the first processing facility experienced a second event based on occurrence of the first event and based on historical occurrences of the first and second events in a plurality of processing facilities;
    in the event that the probability is above a predetermined threshold, determining whether the second processing unit experienced the second event;
    in the event it is determined that the second processing unit experienced the second event, remediating a condition of the second processing unit that caused the second event; and
    updating the Bayesian inference engine with occurrence or non-occurrence of the first and second events at the processing facility.

9. The method of claim 8, wherein the threshold is determined based on a first severity of the first event or based on a second severity of the second event.

10. The method of claim 8, further comprising using the Bayesian inference engine to determine a probability that each of a plurality of events occurred at any processing unit of the processing facility based on occurrence of the first event and based on historical occurrences of the first event and the plurality of events in a plurality of processing facilities.

11. The method of claim 10, further comprising, for each event of the plurality of events, if the probability that the event occurred is above a predetermined threshold defined for each event of the plurality of events, determining whether the event occurred, in order of highest probability to lowest probability.

12. The method of claim 11, wherein each threshold is determined based on a severity of each event.

13. The method of claim 9, wherein the threshold is also determined based on a characteristic of the processing facility.

14. The method of claim 8, wherein using the Bayesian inference engine to determine the probability further comprises applying a weighting factor to the historical occurrences.

15. The method of claim 8, wherein the weighting factor includes a weighting factor for each of the plurality of processing facilities.

16. A method, comprising:
    registering a first event at a first processing unit of a processing facility comprising a first plurality of processing units;
    using a Bayesian inference engine to determine a probability that a second processing unit of the first processing facility experienced a second event based on occurrence of the first event and based on historical occurrences of the first and second events in a plurality of processing facilities;
    in the event that the probability is above a predetermined first threshold, determining whether the second processing unit experienced the second event;
    in the event it is determined that the second processing unit experienced the second event, remediating a condition of the second processing unit that caused the second event;
    updating the Bayesian inference engine with occurrence or non-occurrence of the first and second events at the processing facility;
    in the event that the probability is above a predetermined second threshold, initiating a preventive action with respect to the second event in every processing facility of the plurality of processing facilities.

17. The method of claim 16, wherein the first threshold is determined based on a first severity of the first event at the processing facility or based on a second severity of the second event at the processing facility.

18. The method of claim 16, wherein the second threshold is based on a first combined severity of the first event at the first processing facility and the plurality of processing facilities, and on a second combined severity of the second event at the first processing facility and the plurality of processing facilities.

19. The method of claim 16, wherein using the Bayesian inference engine to determine the probability further comprises applying a weighting factor to the historical occurrences.

20. The method of claim 19, wherein the weighting factor includes a weighting factor for each of the plurality of processing facilities.

* * * * *